United States Patent [19]

Karlstedt

[11] Patent Number: 4,687,133
[45] Date of Patent: Aug. 18, 1987

[54] METHOD AND DEVICE FOR OPERATION OF A HEATING PLANT

[76] Inventor: Johan H. Karlstedt, Sibeliusbulevard, Borga 06100, Finland

[21] Appl. No.: 757,836
[22] PCT Filed: Nov. 14, 1984
[86] PCT No.: PCT/SE84/00388
§ 371 Date: Jul. 11, 1985
§ 102(e) Date: Jul. 11, 1985
[87] PCT Pub. No.: WO85/02247
PCT Pub. Date: May 23, 1985

[30] Foreign Application Priority Data

Nov. 14, 1983 [SE] Sweden .................... 8306259-6

[51] Int. Cl.⁴ .................................... G05D 23/00
[52] U.S. Cl. .................................... 237/2 B; 237/81; 62/238.6
[58] Field of Search ............... 237/2 B, 81; 62/238.6, 62/324.1

[56] References Cited

U.S. PATENT DOCUMENTS

| 4,141,490 | 2/1979 | Franchina | 237/2 B |
| 4,452,620 | 6/1984 | Dosmond | 237/2 B |
| 4,523,438 | 6/1985 | Corti | 237/2 B |

FOREIGN PATENT DOCUMENTS 2263465 10/1975 France .................... 62/238.6

*Primary Examiner*—Henry A. Bennet
*Attorney, Agent, or Firm*—Dowell & Dowell

[57] ABSTRACT

Method and device for operation of a heating plant comprised in a heating system which works with circulation of air. A partial flow (16) of the consumed air in the heating system is supplied to a heat exchanger (4) for heat exchange with intake air (12) coming from outside and with a return flow (14) of circulation air from the heating system. After passage through the heat exchanger (4) the mixture of intake air and return air is fed as heat delivering medium to the evaporator in a circulation heat pump (5). The quantity of air circulating through the heat pump is kept greater than the partial air flow which is exhausted from the heating system via the heat exchanger. With increasing demand for energy the partial flow is exhausted by means of a suction fan (7) and can, in addition, be mixed with the flue gases from a preferable water-carried heating boiler (2).

10 Claims, 2 Drawing Figures

METHOD AND DEVICE FOR OPERATION OF A HEATING PLANT

As is well known, conventional heating plants for heating rooms or buildings and production of tappable hot water, which plants are operated by means of a boiler heated with a fossil fuel such as oil, gas or the like, have considerable drawbacks due to the fact that a substantial portion of the supplied energy is wasted by heat losses with the flue gases escaping through the chimney. In order to improve the economy of the heating people have begun to use heat pumps which raise heat of low temperature to a higher temperature level. The most usual source of heat in this connection is air, both outdoor air and indoor air. When using outdoor air, the drawback is incurred that the efficiency of the heat pump falls drastically at low temperatures, such as lower than −5° C., for example, at which temperature there also arise problems associated with frost deposition on the aggregate. Therefore, in connection with heat pumps operating with outdoor air, another source of heat must be provided, such as an oil-fired boiler or an electric boiler, which is operative during the coldest season.

Return air is a profitable source of heat in such adaptions where a great portion of the air usually is vented out, and, when a heat pump is used, is recycled via the heat pump.

When using outdoor air as a source of heat, attempts have been made to meet the heat demand by means of solely a heat pump, but the measures which must be adopted in this connection for ensuring the operation of the heat pump at low outdoor temperatures, result in the construction of the heat pump being complicated, so that the heat pump becomes expensive both in installation and maintenance. There exist, for example, heat pumps running multi-stepwise to raise the temperature of the air with each step.

The present invention has for its object to provide a method for operation of a heating plant as well as a heating plant for realization of the method, where the above-mentioned drawbacks inherent to the solutions known hitherto are eliminated and a heating plant is accomplished which affords extraordinary operational economy, while at the same time the function and high efficiency of the plant are ensured at all outdoor temperatures.

This object is attained by the method and the heating plant having been given the characterizing features stated in the subsequent claims.

The invention will be described more specifically with reference to the attached drawing.

Figure 1:
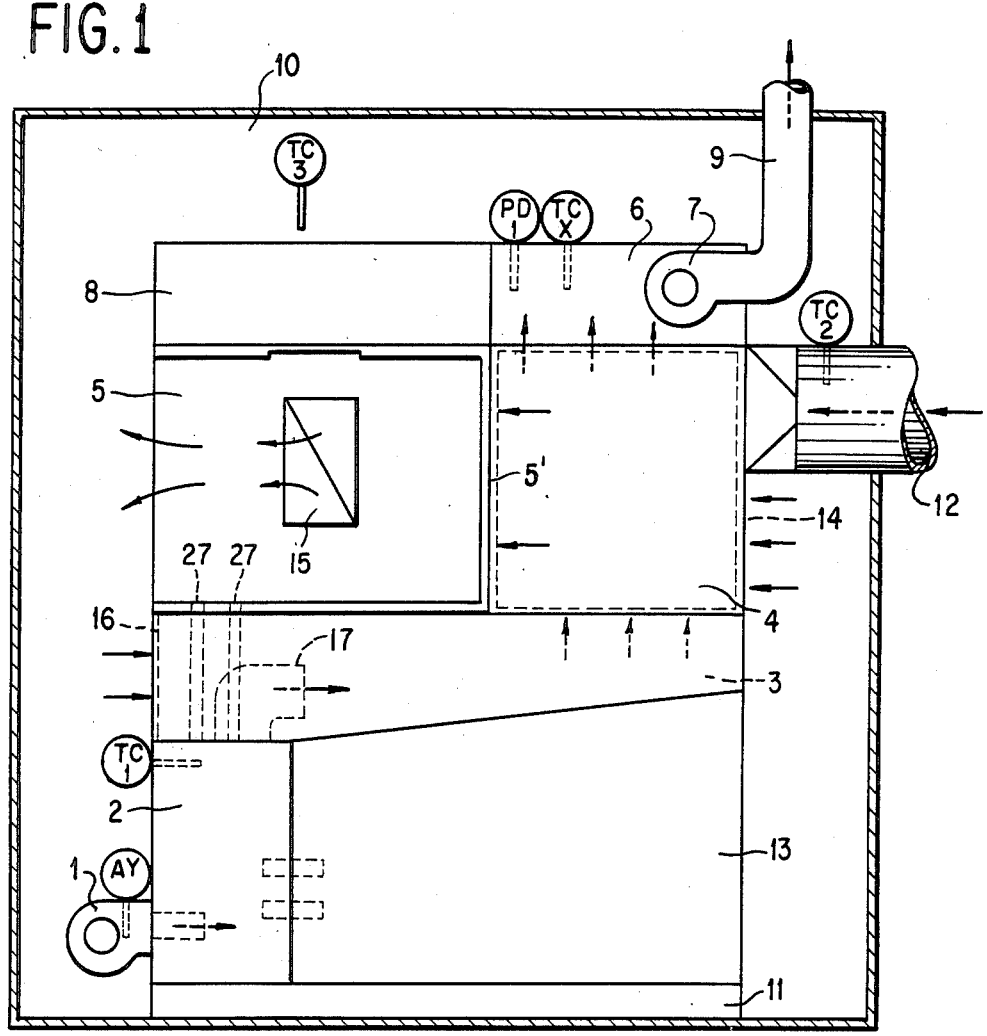
FIG. 1 shows in a diagrammatic manner a cross-section through a heating plant according to the invention.

In the heating plant shown in FIG. 1 reference numeral 1 denotes a burner for oil or gas which is disposed in a water-carried boiler 2, to which a tank or space 13 for production of hot water is connected. The boiler 2 and the tank 13 are positioned on a support 11. Disposed within the space above the boiler 2 and the tank 13, which space constitutes an air channel 3, are a heat exchanger 4 of the cross-flow type and a heat pump 5 for air circulation. Disposed above the heat exchanger 4 is an exhaust chamber 6 equipped with a suction fan 7 connected to an exhaust tube 9 for consumed air or flue gases, respectively, as will be described below. Reference numeral 8 denotes a space containing control equipment for the heating boiler. The entire heating plant is located in a closed boiler room 10.

Connected to the heat exchanger 4 are an intake channel 12 coming from outside for fresh air and an inlet opening 14 for return air from the boiler room 10, which return air circulates in the plant through the heat exchanger 4 and the heat pump 5, as will be described hereinafter. The heat pump 5 has an inlet or intake opening 5' and an exhaust opening 15 for receipt and discharge of the mixture of fresh air and return air circulating therethrough. Reference numeral 16 denotes an intake opening for supply of air from the boiler room 10 to the air channel 3. Opening into the air channel 3 is also an exhaust channel 17 for flue gases from the heating boiler 2.

For control of the operation of the heating plant, a plurality of sensors, arranged in a manner not presented in detail, are connected to the control equipment located in the space 8. Thus, the heating boiler 2 is provided with a temperature sensor TC 1, the fresh air inlet 12 with a temperature sensor TC 2, and the boiler room 10 with a temperature sensor TC 3. A pressure responsive sensor PD 1 and a temperature responsive sensor TC X are disposed in the exhaust chamber 6. The burner 1 or the heating boiler 2 is started and stopped via a control relay denoted AY.

The heating plant shown in the FIG. 1 works in the following manner. The heating plant has an air flow circulating through the heat pump 5 which results from fresh air entering through the fresh air inlet 12 and return air entering through the inlet opening 14. The fresh air and return air R supplied to the heat exchanger 4 and therefrom to the evaporator of the heat pump 5 as heat emitting medium. In the shown embodiment, wherein the heat pump is of a type which heats the water in a water-carried heating system, the circulating air is blown out from the heat exchanger 5 through the exhaust opening 15 into the closed space 10, which in the present case, is the boiler room within which the heating plant is located. It should, however, be clearly understood that the space 10 may be a larger premise, wherein the heating plant is located, the air exhausted at 15 then constituting the heating medium for the premise. It is also conceivable that the exhaust opening 15 from the heat pump 5 is connected to a heating system which works with blast injection of hot air into the spaces to be heated, the exhaust opening 15 in this case supplying air to such system. This implies, of course, that the return air from the ventilation system is returned to the space 10 in which the heating plant is located.

In the shown embodiment where the heat pump 5 serves for heating of the circulating water, as is mentioned above, the air is thus blown out from the exhaust opening 15 into the space 10. From the space 10 a partial air flow advances through the intake opening 16 and the gas channel 3 to the heat exchanger 4 which is of the cross-flow type, i.e. with two entirely closed systems of channels which separated from each other extend in opposing directions. After having passed through the heat exchanger 4 this partial air flow, which through the opening 16 has entered from the space 10, is discharged into the atmosphere through the exhaust pipe 9. During its passage through the heat exchanger 4, the partial air flow preheats the mixture of fresh air entering into the channel 12, and return air entering through the intake opening 14 from the boiler room 10. The air flow circulating through the heat pump shall surpass the quantity of air discharged through the exhaust tube 9 so as to cause a higher pressure to prevail in the boiler room 10 or the space corresponding thereto than in the exhaust chamber 6 in the heating plant. The described conditions of operation of the heating plant prevails if the circulation heat pump primarily solely provides for the energy supply to the heating system. When it becomes necessary to increase the content of energy in the circulating air flow through the heat exchanger 4 to the heat pump 5, as for example during the warm and moist period of the year when only the heat pump supplies the energy to the heating plant, the suction fan 7 is started to increase the flow through the heat exchanger 4 of both exhausted air and entering air which has a higher value of enthalpy. During the colder period of the year or when the outdoor temperature is low, which condition as sensed by the temperature sensors as described below, the burner 1 for the heating boiler 2 is started and the flue gases from the heating boiler 2 are delivered through the exhaust tube 17 to the channel 3 to be mixed with the exhaust air from the opening 16, whereby the amount of energy in the air flow from the heat exchanger 4 to the heat pump 5 is increased further.

It will be evident from the description made hereinbefore, that the combination of the heating boiler 2, the heat exchanger 4 and the heat pump 5 results in a plant in which the heat pump 5 always is operated under favourable conditions. When the temperature at TC 1 has fallen below a predetermined set value, the heat pump starts, and when the outdoor temperature at TC 2 surpasses the set predetermined value, the suction fan starts in order to increase the amount of energy in the air flow to the heat pump. When the temperatures at TC 1, TC 2 and TC 3 at the same time lie below the set values for all of them, the suction fan starts, and when the partial vacuum at PD 1 in the exhaust chamber 6 has fallen below the set predetermined value, the burner 1 of the heating boiler 2 is made operative by the control relay AY. When the temperature in the boiler room 10 at TC 3 has surpassed the set value, the burner 1 stops until the suction fan 7 and the heat pump 5 consume the heat accumulated in the boiler room and starts again when the temperature has fallen below the set value. When the temperature in the water flow at TC 1 has surpassed the set value, the burner and the suction fan are stopped, but the heat pump continues to work until a slightly higher temperature at TC 1 has been reached, and when the temperature falls, the burner and the suction fan become operative again. The temperature sensor disposed at TC X in the exhaust chamber prevents the burner becoming operative as long as the temperature is higher than the set value. The circulation pump of the heat pump 5 works continuously.

Due to the feature that the heat pump 5 for the circulating air, the suction fan 7 and the heating boiler 2 each are started in sequence, one after the other when the energy demand grows, the most favourable conditions of operation of the plant are achieved. In connection with a water-carried heating boiler 2 and a heat pump 5 with heating by means of water, it is suitable that the water systems of the boiler 2 and the pump 5 are interconnected in sequence in order to obtain a higher outgoing water temperature from the heating plant. The combustion air to the burner 1 of the heating boiler 2, which consists of room air, is also condensing dried by the circulation air heat pump 5, for which reason no condensation occurs on cold channel surfaces. All condensation of the moisture existent in the fresh air introduced through the intake 12 is effected in the evaporation section of the heat pump 5, where the pure condensation water can be collected and removed.

Figure 2:
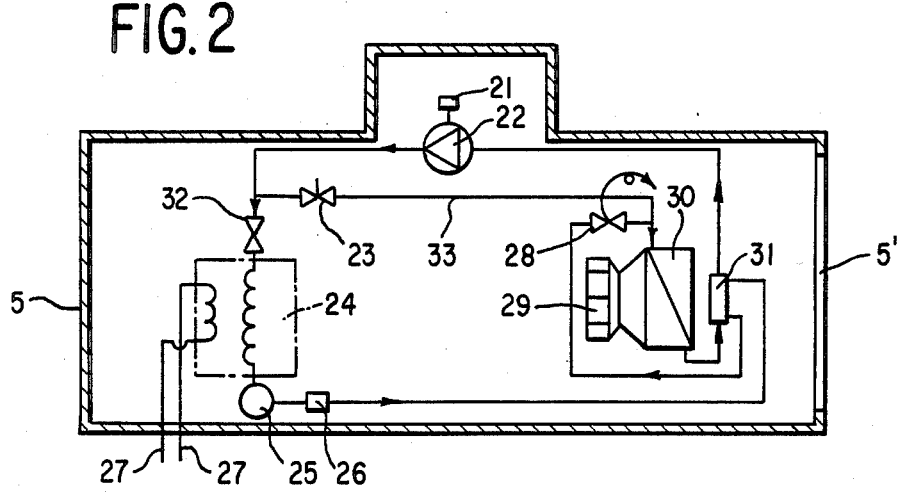
FIG. 2 shows a principal diagram of the heat pump forming part of the heating plant shown in FIG. 1.

The heat pump forming part of the plant may be of conventional type, as is shown in FIG. 2, for example. From the evaporator 30 the working agent flows via a heat exchanger 31 to the compressor 22 provided with a pressure setter 21 via a counter-valve 32 to a coaxial condenser 24 for heat exchange with water in a water-carried system having inlet and discharge conduits 27. From the condenser 24 the working agent flows over a receiver 25 and a filter 26 back to the heat exchanger 31 and via a theremostat valve 28 to the evaporator 30. Reference numeral 29 denotes a rotary blower located in the evaporator unit. A branch conduit 33 leading to the evaporator 30 is controlled by a solenoid valve 23. In a heating system working with warmed air, the condenser unit 24 will, of course, be given a shape corresponding hereto.

The moisture generated in the combustion process is condensed in the heat exchanger and gives away its condensing energy to the circulation air stream. The acid condensate with pH about 2,5 is drained off through a neutralization system and led to waist, whereby it is given an acidity of about 6 pH.

It is obvious that the description given hereinbefore does not present more than an advantageous embodiment of the invention and that changes and modifications thereof can be made within the scope of the subsequent claims.

I claim:

1. A method of heating a fluid medium utilizing a heating plant located within a room wherein the heating plant includes an outside air intake and an exhaust duct system in which a suction fan is located in order to exhaust air from within the room, a heat exchanger, a heat pump having a medium heating means, a mixed air inlet, an exhaust outlet, and an evaporator through which the mixed air passes, and a boiler having a burner which is selectively operated with the exhaust gases therefrom being vented through the exhaust duct system comprising the steps of:
   (a) Passing a mixture of outside intake air and air from within the room through the heat exchanger and into the mixed air inlet of the heat pump;
   (b) Preheating the mixture of outside intake air and air from within the room as it passes through the heat exchanger by utilizing other air from within the room which is being exhausted through the exhaust duct system;
   (c) Passing the preheated mixture of outside intake air and room air in heat exchange relationship with the evaporator and exhausting the air into the room;
   (d) Maintaining an air flow rate through the heat pump at a greater rate than the air flow rate being exhausted through the exhaust duct system whereby the pressure within the room is greater than the pressure within the air duct system.

2. The method of claim 1 in which the rate of exhaust air flow through the exhaust duct system is increased by operation of the suction fan to thereby obtain an increased energy exchange through the heat exchanger.

3. The method of claim 1 including preheating the mixture of outside intake air and air from within the room as it passes through the heat exchanger by utilizing a combination of other air within the room and exhaust gases from the boiler.

4. The method of claim 3 in which the operation of the suction fan is initiated at temperatures below a first predetermined temperature.

5. The method of claim 4 in which the burner of the boiler is operated at temperatures below a second predetermined temperature with such second predetermined temperature being less than the first predetermined temperature with respect to the operation of the suction fan.

6. The method of claim 4 in which the burner of the boiler operates only when the suction fan has produced a predetermined minimum negative pressure between the suction fan and the heat exchanger.

7. The method of claim 3 in which the burner of the boiler is initiated in response to the temperature of the medium within the heating plant falling below a predetermined level.

8. The method of claim 3 in which the burner of the boiler is initiated only in response to the intake air temperature falling below a predetermined level.

9. In a heating plant for heating a liquid medium in a boiler located within a room and wherein the boiler includes a burner and a flue gas vent, the improvement comprising an air intake means and an air exhaust duct means, a cross flow heat exchange means disposed along said air exhaust duct means, said cross flow heat exchange means having a first inlet for receiving intake air and a second inlet for receiving air from within the room so that intake air passing inwardly of the heating plant through said air intake means and air within the room are passed in heat exchange relationship with air being exhausted through said air exhaust duct means, a heat pump means having an inlet for receiving preheated air passing from said heat exchange means, said heat pump having evaporator means in heat exchange relationship with said preheated air, said heat pump having condensor means, conduit means connecting said condensor means in heat exchange relation with the liquid medium being heated in the boiler, an exhaust opening from said heat pump through which said preheated air is exhausted into the room, the flue gas vent of the boiler being disposed within said air exhaust duct means, an opening connecting said air exhaust duct means with the air within the room, and exhaust fan means located within said exhaust duct means.

10. The heating plant of claim 9 including sensor means for selectively controlling the operation of said exhaust fan and the boiler so that the rate of air flow through the exhaust duct means and the amount of heat vented therein from the flue gas vent may be selectively varied.

* * * * *